(12) United States Patent
Nuzzo et al.

(10) Patent No.: US 10,447,128 B2
(45) Date of Patent: Oct. 15, 2019

(54) STATOR AND MULTIPHASE BRUSHLESS MOTOR HAVING THE SAME

(71) Applicant: Johnson Electric S.A., Murten (CH)

(72) Inventors: Gionatan Nuzzo, Asti (IT); Fabio Olmo, Montegrosso d'Asti (IT)

(73) Assignee: Johnson Electric International AG, Murten (CH)

( * ) Notice: Subject to any disclaimer, the term of this patent is extended or adjusted under 35 U.S.C. 154(b) by 255 days.

(21) Appl. No.: 15/395,462

(22) Filed: Dec. 30, 2016

(65) Prior Publication Data

US 2017/0194847 A1    Jul. 6, 2017

(30) Foreign Application Priority Data

Dec. 30, 2015  (IT) .................. 102015000089078

(51) Int. Cl.
| | |
|---|---|
| *H02K 21/22* | (2006.01) |
| *H02K 1/14* | (2006.01) |
| *H02K 1/27* | (2006.01) |
| *H02K 3/18* | (2006.01) |
| *H02K 5/22* | (2006.01) |
| *H02K 3/52* | (2006.01) |
| *H02K 41/03* | (2006.01) |

(52) U.S. Cl.
CPC ............ *H02K 21/22* (2013.01); *H02K 1/146* (2013.01); *H02K 1/2786* (2013.01); *H02K 3/18* (2013.01); *H02K 3/522* (2013.01); *H02K 5/225* (2013.01); *H02K 41/031* (2013.01); *H02K 2203/06* (2013.01)

(58) Field of Classification Search
CPC ............................ H02K 41/031; H02K 5/225

USPC .................................... 310/12.24, 49.46, 71
See application file for complete search history.

(56) References Cited

U.S. PATENT DOCUMENTS

| | | | | |
|---|---|---|---|---|
| 2003/0151317 A1* | 8/2003 | Yoshida | ................. | H02K 3/522 310/71 |
| 2009/0243408 A1* | 10/2009 | Ueta | ...................... | H02K 1/148 310/71 |
| 2013/0169086 A1* | 7/2013 | Chai | ...................... | H02K 3/522 310/71 |
| 2014/0103759 A1* | 4/2014 | Miyabara | ............... | H02K 3/522 310/71 |

(Continued)

FOREIGN PATENT DOCUMENTS

| | | |
|---|---|---|
| CN | 102163885 A | 8/2011 |
| CN | 204391938 U | 6/2015 |

*Primary Examiner* — Gary A Nash
(74) *Attorney, Agent, or Firm* — Muncy, Geissler, Olds & Lowe, P.C.

(57) ABSTRACT

A stator and a multiphase brushless electric motor utilizing the stator are provided. The stator which includes a stator core having a ring portion and a plurality of stator poles; a plurality of stator coils wound on the stator poles and having coil terminals; and a wiring frame fixed to the stator core, and comprising a plurality of conducting electrically insulated from each other. The conductor elements are electrically coupled to corresponding coils terminals to form multiphase windings. At least three coil terminals of the stator coils electrically coupled to respective conducting members are directly electrically coupled to a multi-phase power supply. The above stator can provide a simple, economic and reliable connection between the coil terminals and the multiphase power supply.

17 Claims, 7 Drawing Sheets

(56) References Cited

U.S. PATENT DOCUMENTS

2014/0339936 A1* 11/2014 Sahara .................... H02K 3/28
                                                                                    310/71

* cited by examiner

STATOR AND MULTIPHASE BRUSHLESS MOTOR HAVING THE SAME

CROSS REFERENCE TO RELATED APPLICATIONS

This non-provisional patent application claims priority under 35 U.S.C. § 119(a) from Patent Application No. 102015000089078 filed in Italy on Dec. 30, 2015, the entire contents of which are hereby incorporated by reference.

FIELD OF THE INVENTION

This invention relates to a stator and a multiphase brushless motor having the same.

BACKGROUND OF THE INVENTION

Stator of brushless motor includes a stator core and a plurality of stator coils. The stator core has a ring portion extending in an axial direction and a plurality of stator poles extending radially from the ring portion. The stator coils are wound on the stator poles, and have coil terminals. The coil terminals are to be connected to a multiphase power supply.

It is an object of the present invention to provide a stator with a simple, economic and reliable connection between the coil terminals and the multiphase power supply.

SUMMARY OF THE INVENTION

Accordingly, in one aspect thereof, the present invention provides a stator which includes a stator core having a ring portion and a plurality of stator poles; a plurality of stator coils wound on the stator poles and having coil terminals; and a wiring frame fixed to the stator core, and comprising a plurality of conducting electrically insulated from each other. The conducting elements are electrically coupled to corresponding coils terminals to form multiphase windings. At least three coil terminals of the stator coils electrically coupled to respective conducting members are directly electrically coupled to a multi-phase power supply.

Accordingly, the present invention provides a stator for a multiphase brushless motor which comprises a stator core having a ring portion and a plurality of stator poles extending radially from the ring portion; a plurality of stator coils respectively wound on the stator poles and having coil terminals; and a wiring frame fixed to the stator core comprising a plurality of conducting elements electrically insulated from each other, each conducting element being electrically coupled to corresponding coils terminals to form multiphase windings. The multiphase windings have a plurality of phase terminals configured to be electrically coupled to a multi-phase power supply. The stator further comprises an insulating holder coupled to the stator. The phase terminals are coil terminals of the stator coils and held by the insulating holder.

Accordingly, in another aspect thereof, the present invention provides a multiphase brushless electric motor which comprises a permanent magnet rotor and a stator. The stator comprises a stator core having a ring portion and a plurality of stator poles; a plurality of stator coils wound on the stator poles and having coil terminals; and a wiring frame fixed to the stator core, and comprising a plurality of conducting electrically insulated from each other. Each conducting member is electrically coupled to corresponding coil terminals to form one phase winding. At least three coil terminals of the stator coils electrically coupled to respective conducting members are directly electrically coupled to a multiphase power supply.

In the above stator, as the coil terminals of the stator coil L directly act as the phase terminals X, Y and Z, the phase terminals can be easily provided. Therefore, the above stator can provide a simple, economic and reliable connection between the coil terminals and the multiphase power supply.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
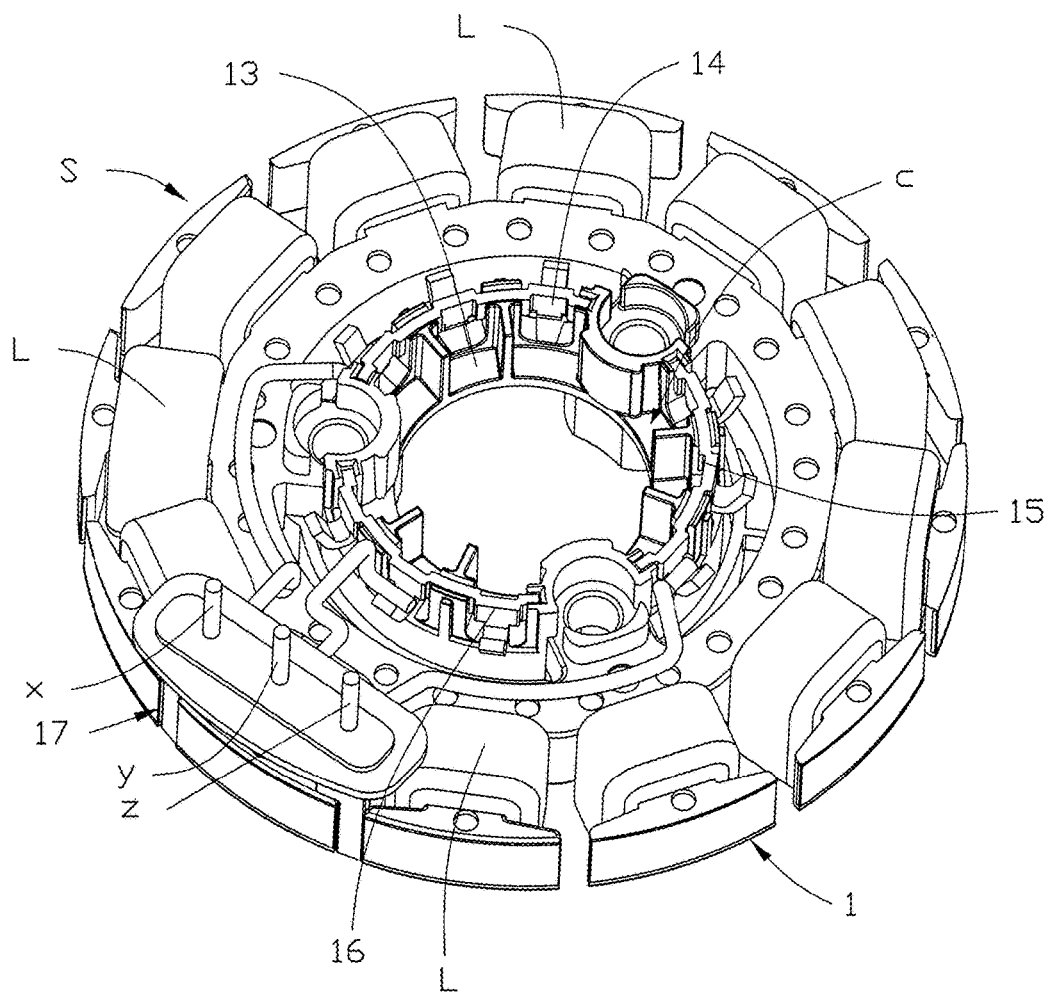
FIG. 1 is an assembled view of a stator in the preferred embodiment.
Figure 2:
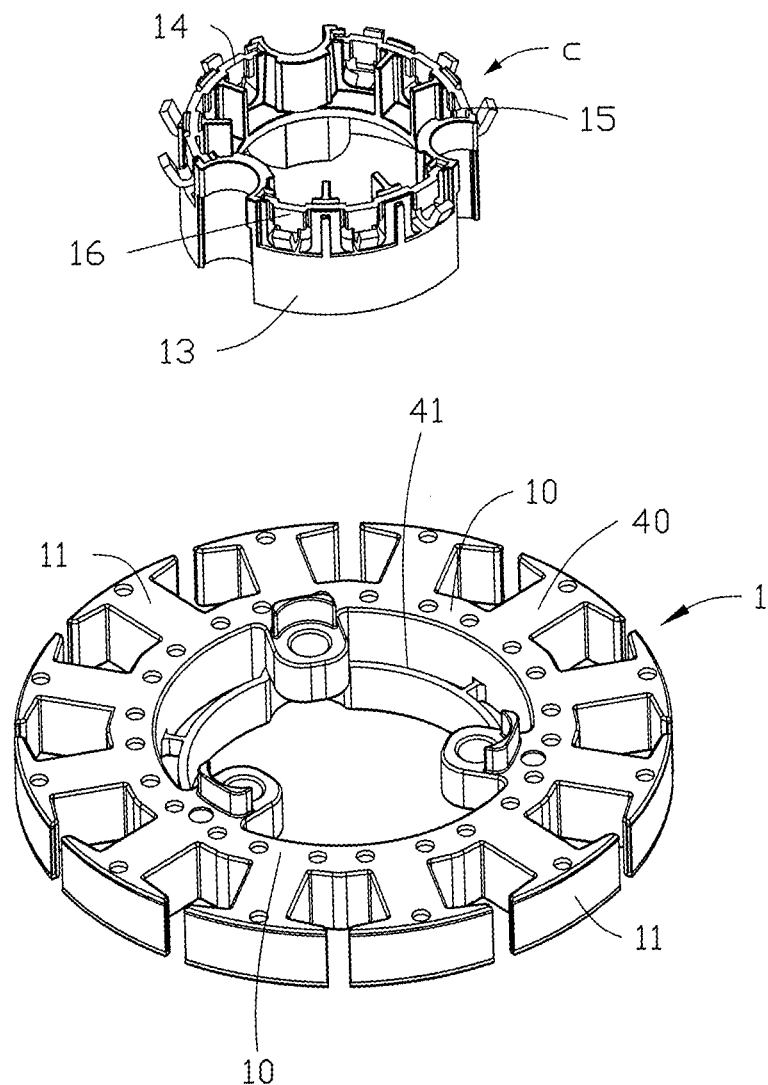
FIG. 2 is an exploded view of the stator of FIG. 1, with coils and a holder thereof removed.
Figure 3:
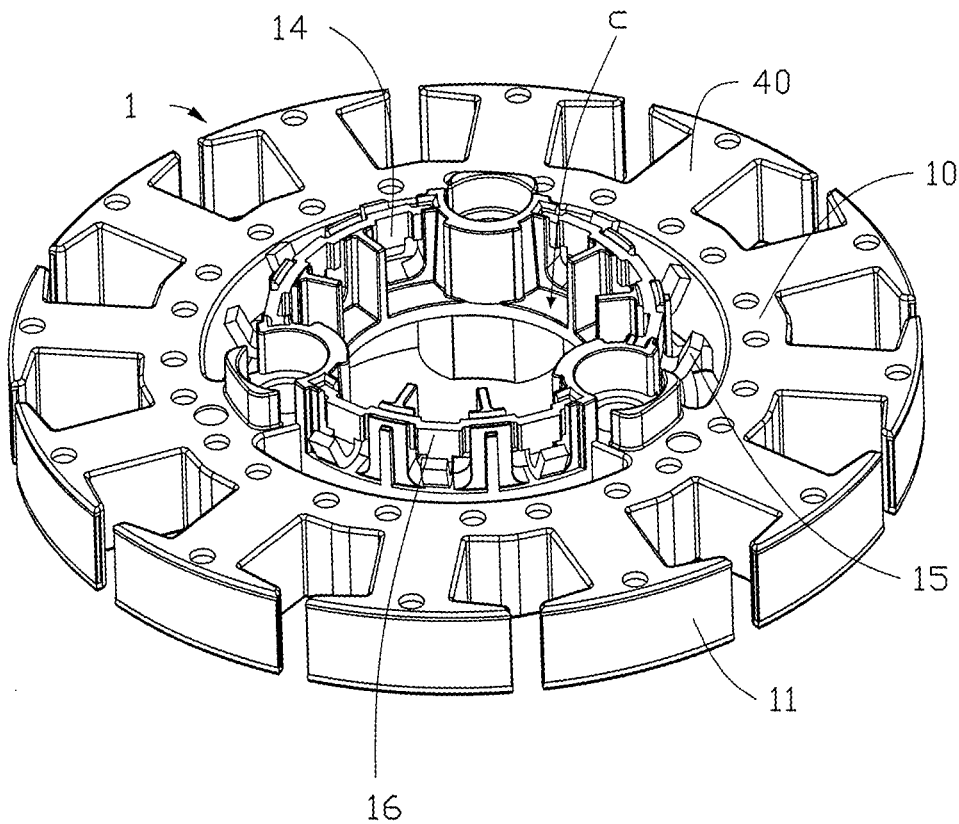
FIG. 3 is an assembled view of FIG. 2.
Figure 4:
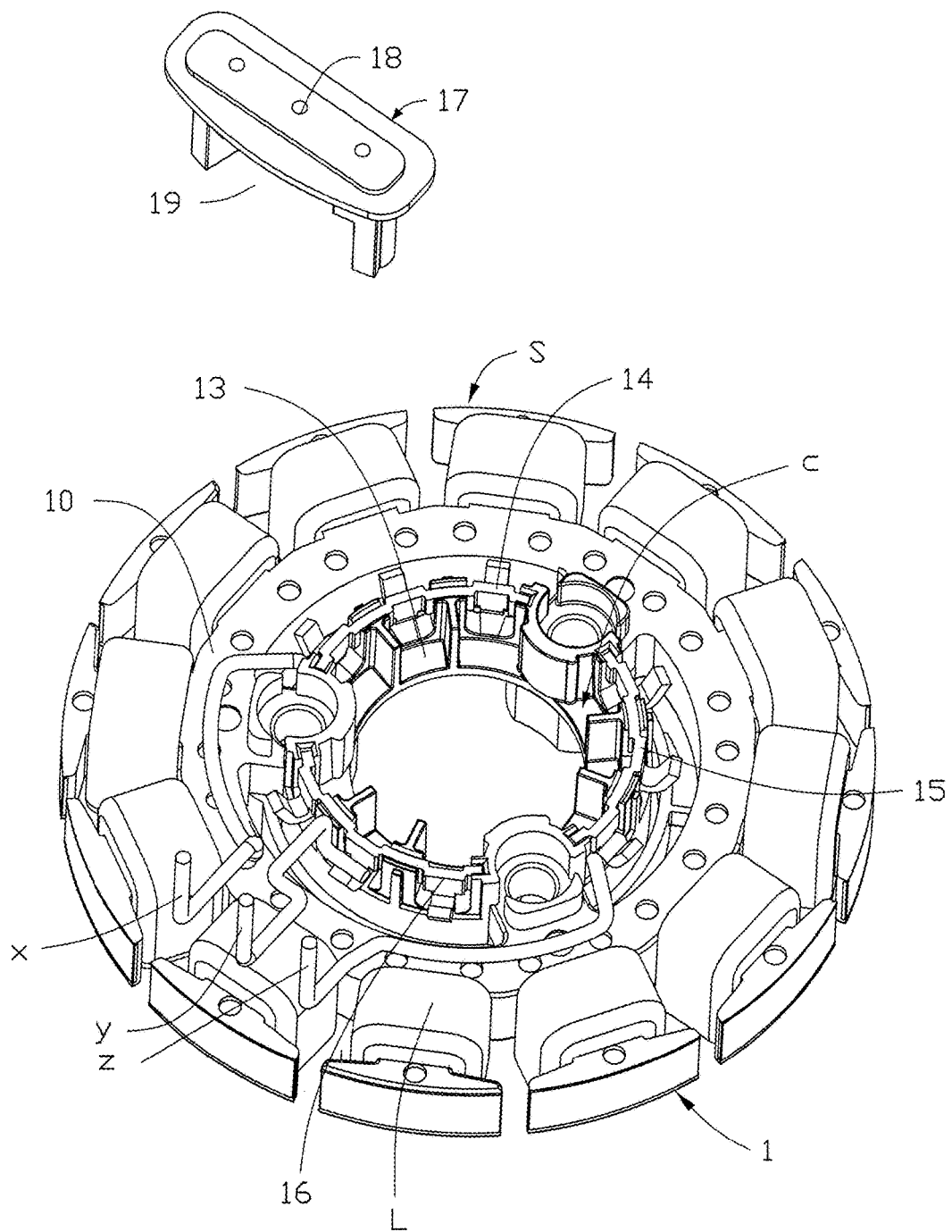
FIG. 4 is a partially exploded view of the stator of FIG. 1.

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "fixed" to another component, it can be directly fixed to the another component or there may be an intermediate component. When a component is described to be "connected" to another component, it can be directly connected to the another component or there may be an intermediate component. When a component is described to be "disposed" on another component, it can be directly disposed on the another component or there may be an intermediate component. The directional phraseologies such as "perpendicular", "horizontal", "left", "right" or similar expressions are for the purposes of illustration only.

Unless otherwise specified, all technical and scientific terms have the ordinary meaning as understood by people skilled in the art. The terms used in this disclosure are illustrative rather than limiting. The term "and/or" as used in this disclosure means that each and every combination of one or more associated items listed are included.

Referring to FIGS. 1-4, the symbol S indicates a stator for a three-phase brushless motor, more specifically for a multiphase brushless Direct-Current motor. The stator S comprises a stator core 1 which is preferably made of a pack of laminations stacked together. The stator core 1 comprises a ring portion 10 extending in an axial direction and a plurality of stator poles 11 extending radially and outwardly from the ring portion 10. Each of the stator poles 11 is wound by a stator coil L. Each stator coil L comprises two coil terminals (not labeled). The stator coils L can be separately wound on the stator teeth 11 or continuous wound on the stator teeth 11. In the case that the stator coils L are wound in a continuous manner, both ends of the stator coil L corresponding to each stator tooth 11 are two coil terminals.

In the embodiment, the stator pole 11 is substantially T-shaped. The stator coil L is wound between the ring portion 10 and the distal branch of the stator pole 11.

The Stator S further comprises an insulating structure 40. In order to isolate the stator coils L from the stator core 1, the insulating structure 40 is preferably formed as an encapsulating insulating structure over the stator core 1 by an over mold process. The insulating structure 40 can be made from a material such as plastic or resin.

The Stator S further comprises a wiring frame C. The wiring frame C comprises an insulating carrier 13 which may be formed from plastic material and three conducting members 14, 15, 16 electrically insulated from each other by the carrier 13.

In the embodiment, the insulating structure 40 has a mounting structure 41 disposed inside the ring portion 10 of the stator core 1. The insulating carrier 13 is annular and fixed to or inside the mounting structure 41. The conducting member 14, 15, 16 is a monolithic member which includes an arc-shaped body (not labeled) and a plurality of conducting terminals (not labeled) integrally extending from the body. Each conducting terminal is electrically connected to at least one corresponding coil terminal. The conducting terminals of each conducting member are electrically connected to corresponding coil terminals to form one phase winding. The conducting members 14, 15, 16 are configured to form three-phase windings. Arbitrary three coil terminals of the stator coils L which respectively electrically connected to three conducting members 14, 15, 16 act as phase terminals X, Y, Z.

Figure 5:
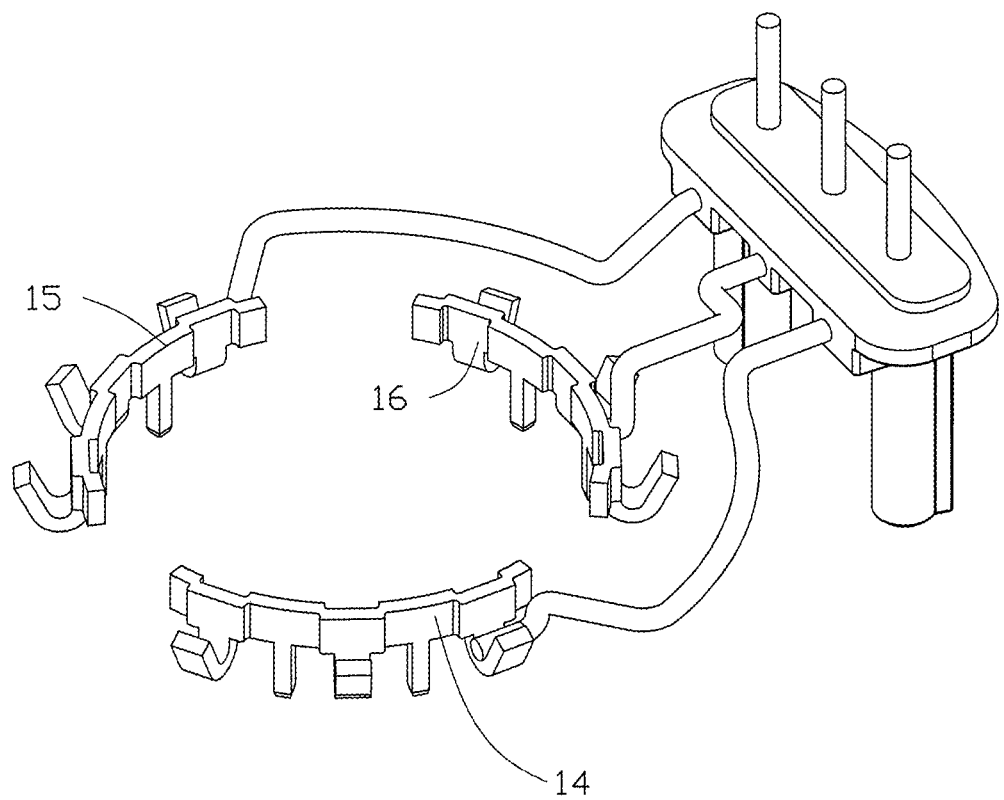
FIG. 5 illustrates holder and conducting members of the wiring frame of FIG. 1.

As illustrated by FIG. 5, the conducting members 14, 15, 16 can be spaced from each other in a circumferential direction, and the conducting members 14, 15, 16 are located at a same horizontal level, so that a axial thickness of the wiring frame C is reduced.

The stator S further comprises an insulating holder 17 for holding the phase terminals X, Y and Z in the predetermined positions. The insulating holder 17 includes a body with a plurality of passages or seats 18 and a notch formation 19. The notch formation 19 is engaged to the stator pole 11 which is wound by the stator coil L along the axial direction of the stator core 1. The phase terminals X, Y and Z pass through the passages or the seats 18 and extend to the outside of the insulating holder 17 to be electrically coupled to a three-phase power supply. The phase terminals X, Y and Z extend axially and are essentially paralleled to each other.

Figure 8:
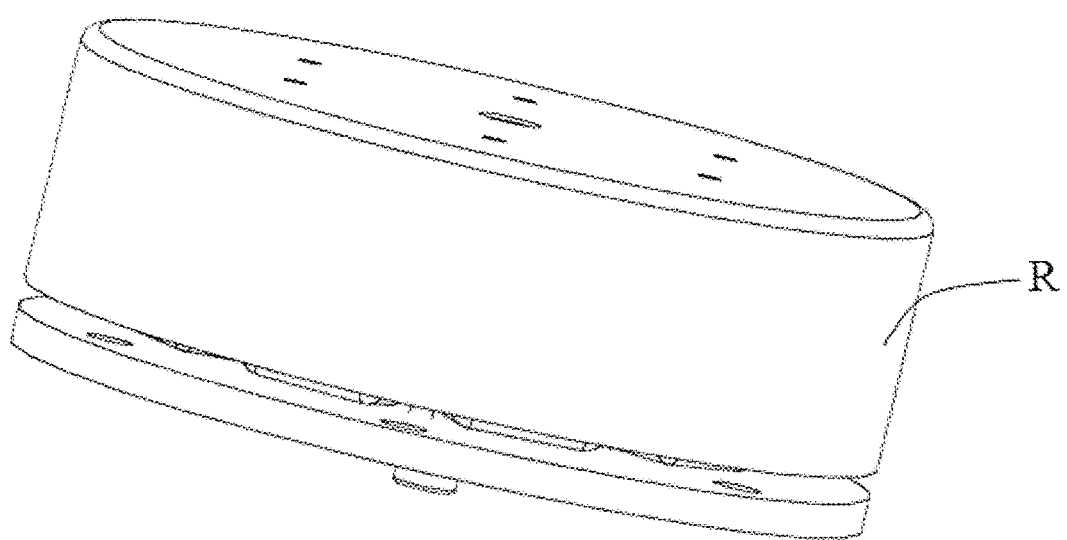
FIG. 8 is a view of a typical three-phase brushless direct-current motor.

Referring to FIG. 8 illustrates a typical three-phase brushless direct-current motor which includes a stator and a permanent magnet rotor R. The stator is preferably mounted inside a permanent magnets rotor R. The stator can be the foregoing stator S in the FIGS. 1-4.

Advantageously, as the coil terminals of the stator coil L directly act as the phase terminals X, Y and Z, the phase terminals can be easily provided. Furthermore, the insulating holder 17 is simple and economical, and can be easily fixed to the stator pole 11.

Figure 6:
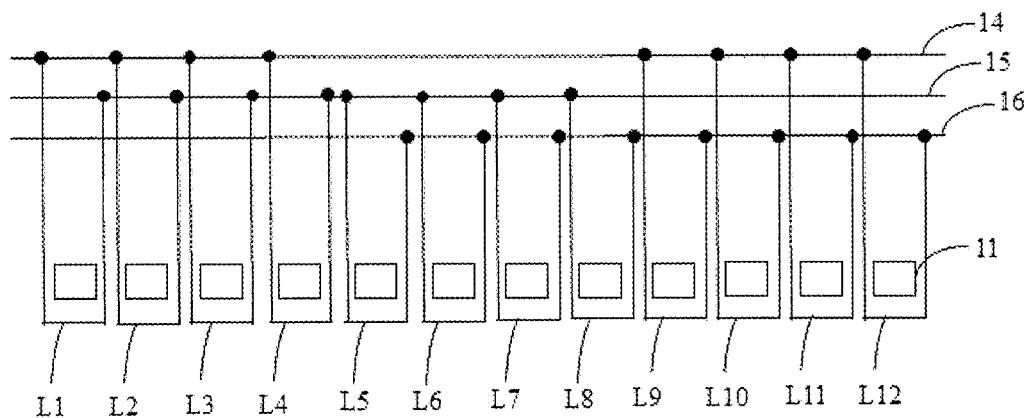
FIG. 6 illustrates electrical connection between the conducting members of the wiring frame and the stator coils in some embodiments.

FIG. 6 illustrates electrical connection between the conducting members of the wiring frame and the stator coils in some embodiments. Assume that the number of the stator coils L is M. M is a multiple of three. Each conducting member is electrically coupled to 2M/3 coil terminals to form M/3 parallel branches between two arbitrary conducting members. More specially, in the embodiment, M is equal to 12. The conducting member 14 is electrically connected to the first coil terminals of the stator coils L1-L4 and the first coil terminals of the stator coils L9-L12. The conducting member 15 is electrically connected to the second coil terminals of the stator coils L1-L4 and the first coil terminals of the stator coils L5-L8. The conducting member 16 is electrically connected to the second coil terminals of the stator coils L5-L8 and the second coil terminals of the stator coils L9-L12. Arbitrary three coil terminals respectively connected to the conducting members 14, 15 and 16 act as three phase terminals X, Y and Z to be electrically coupled to a three-phase power supply.

Figure 7:
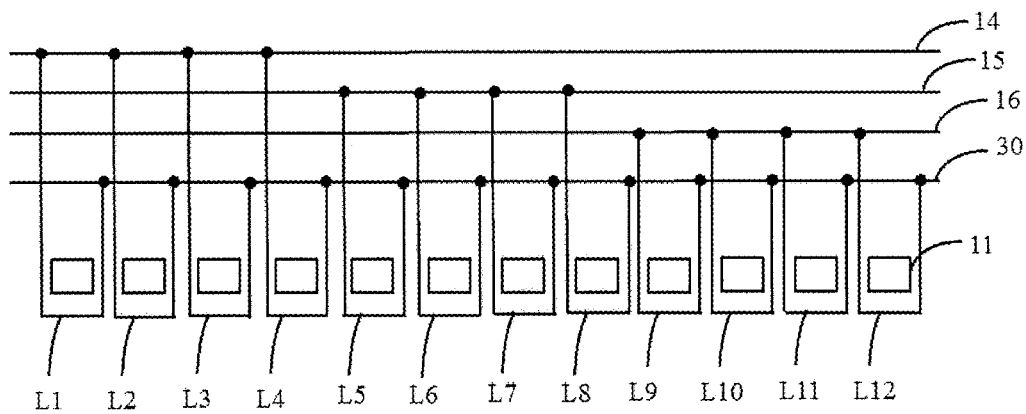
FIG. 7 illustrates electrical connection between the conducting members of the wiring frame and the stator coils in alternative embodiments.

FIG. 7 illustrates another connection between the conducting members of the wiring frame and the stator coils in some embodiments. The conducting member 14 is electrically connected to the first coil terminals of the stator coils L1-L4. The conducting member 15 is electrically connected to the first coil terminals of the stator coils L5-L8. The conducting member 16 is electrically connected to the first coil terminals of the stator coils L9-L12. The wiring frame C further comprises a common conducting member 30 which is electrically connected to the second coil terminals of the stator coils L1-L12. Arbitrary three coil terminals respectively connected to the conducting members 14, 15 and 16 act as three phase terminals X, Y and Z to be electrically coupled to a three-phase power supply.

In various embodiments, the brushless motor also can be N-phase brushless motor. N is an integer greater than 3. As such, the wiring frame C comprises N conducting members. N coil terminals of the stator coils respectively connected to N conducting members will be acted as N phase terminals to be electrically coupled to an N-phase power supply.

It shall be noted that the one of ordinary skill in the art will clearly understand that the connection between the conducting members 14, 15 and 16 of the wiring frame C and the stator coils L may be different from the illustrated implementations, and that connection provided herein are thus not intended to limit the scope of other embodiments or implementations or the scope of the claims, unless otherwise specifically claimed or recited.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A stator comprising:
   a stator core having a ring portion and a plurality of stator poles extending radially from the ring portion;

a plurality of stator coils wound on the stator poles and having coil terminals;

a wiring frame fixed to the stator core, and comprising a plurality of conducting members electrically insulated from each other, the conducting elements being electrically coupled to corresponding coils terminals to form multiphase windings; and an insulating holder coupled to the stator, wherein at least three coil terminals of the stator coils electrically coupled to respective conducting members are directly electrically coupled to a multi-phase power supply, and wherein the at least three coil terminals are held by the insulating holder.

2. The stator of claim 1, wherein the insulating holder comprises a notch formation engaged to at least one of the stator poles along an axial direction of the stator core.

3. The stator of claim 1, wherein the insulating holder comprises a body with a plurality of passages or seats, the at least three coil terminals pass through the passages or seats and extend to the outside of the insulating holder to be electrically coupled to a multi-phase power supply.

4. The stator of claim 3, wherein the at least three coil terminals are essentially paralleled to each other along the axial direction.

5. The stator of claim 1, wherein the number of the conducting members is three, and three coil terminals of the stator coils respectively electrically coupled to the corresponding conducting members of the stator are directly electrically coupled to a three-phase power supply.

6. The stator of claim 1, further comprising an insulating structure configured to isolate the stator coils from the stator core.

7. The stator of claim 1, wherein the conducting members are spaced from each other in a circumferential direction, and located at a same horizontal level.

8. The stator of claim 1, wherein the number of the stator coils is M which is a multiple of three, the stator coil corresponding to each stator pole comprising two coil terminals, each conducting member being electrically coupled to 2M/3 coil terminals to form M/3 parallel branches between two arbitrary conducting members.

9. The stator of claim 1, wherein the wiring frame further comprises a common conducting member, the stator coil corresponding to each stator pole comprising a first coil terminal and a second coil terminal, the conducting members being respectively electrically coupled to the first terminal of corresponding stator coils, the common conducting member being electrically coupled to all the second coil terminals.

10. The stator of claim 1, wherein the stator poles extend radially and outwardly from the ring portion, the wiring frame further comprising an electrically insulating carrier being inside of the ring portion of the stator core, the conducting members electrically insulated from each other by the carrier.

11. A stator for a multiphase brushless motor, comprising:

a stator core having a ring portion and a plurality of stator poles extending radially from the ring portion;

a plurality of stator coils respectively wound on the stator poles and having coil terminals;

a wiring frame fixed to the stator core comprising a plurality of conducting elements electrically insulated from each other, the conducting elements being electrically coupled to corresponding coils terminals to form multiphase windings; and an insulating holder coupled to at least one of the stator poles, wherein the multiphase windings have a plurality of phase terminals configured to be electrically coupled to a multi-phase power supply;

wherein the phase terminals are formed by the coil terminals of the stator coils, and wherein the phase terminals are held by the insulating holder.

12. The stator of claim 11, wherein the insulating holder comprises a notch formation fixed to at least one of the stator poles along an axial direction of the stator core.

13. The stator of claim 11, wherein the insulating holder comprises a body with a plurality of passages or seats, the phase terminals pass through the passages or seats and extend to the outside of the insulating holder to be electrically coupled to a multi-phase power supply.

14. The stator of claim 13, wherein the phase terminals are essentially paralleled to each other.

15. A multiphase brushless electric motor, comprising:

a permanent magnet rotor, and a stator, comprising:

a stator core having a ring portion and a plurality of stator poles extending radially from the ring portion;

a plurality of stator coils wound on the stator poles and having coil terminals;

a wiring frame fixed to the stator core, and comprising a plurality of conducting members electrically insulated from each other, the conducting elements being electrically coupled to corresponding coils terminals to form multiphase windings; and an insulating holder coupled to the stator, wherein at least three coil terminals of the stator coils electrically coupled to respective conducting members are directly electrically coupled to a multi-phase power supply, and wherein the at least three coil terminals are held by the insulating holder.

16. The motor of claim 15, wherein the insulating holder comprises a notch formation engaged to at least one of the stator poles along an axial direction of the stator core.

17. The motor of claim 15, wherein the motor is a three-phase brushless direct current motor, the stator being mounted inside the permanent magnets rotor.

* * * * *